United States Patent [19]
Whang

[11] 3,988,676
[45] Oct. 26, 1976

[54] CODING AND DECODING SYSTEM WITH MULTI-LEVEL FORMAT
[75] Inventor: Sang Y. Whang, Miami, Fla.
[73] Assignee: Milgo Electronic Corporation, Miami, Fla.
[22] Filed: Feb. 20, 1975
[21] Appl. No.: 551,402

Related U.S. Application Data
[60] Continuation of Ser. No. 372,167, June 21, 1973, abandoned, which is a division of Ser. No. 143,762, May 17, 1971, Pat. No. 3,760,277.

[52] U.S. Cl. .............................. 325/38 A; 328/164; 340/347 DD
[51] Int. Cl.² ...................................... H03K 13/00
[58] Field of Search .............. 325/38 A, 42, 65, 13; 340/347 DD; 235/154; 178/68, 70; 333/15, 18; 328/164

[56] References Cited
UNITED STATES PATENTS
| | | | |
|---|---|---|---|
| 3,267,459 | 8/1966 | Chomicki et al. | 325/38 A |
| 3,679,977 | 7/1972 | Howson | 325/38 A X |
| 3,716,852 | 2/1973 | Sawai | 325/38 A X |
| 3,723,880 | 3/1973 | Van Gerwen | 325/38 A |

Primary Examiner—Thomas J. Sloyan
Attorney, Agent, or Firm—Jackson & Jones

[57] ABSTRACT

The present invention is directed to a method and apparatus for coding and decoding data so that it may be transmitted from point to point in either a baseband system or in a carrier system. The method and apparatus involves forming a multi-bit group of binary signals (bits) and transmitting such signals with at least one bit and a fractional part of another bit of the group in an encoding period. In a preferred embodiment of my invention a pair of adjacent encoding periods are employed to fully identify all the bits of a multi-bit group. My format requires less bandwidth than prior art binary formats. Furthermore, my format, when employed with a three level system, also requires less bandwidth than any known prior art three level system.

The invention also includes an inherent error detection capability. Such inherent error detection is utilized at the receiver to automatically emit a decoded signal which has a high probability of being the correct signal that was transmitted. In addition, the invention readily provides a signal of a unique characteristic from which a decoding clock can be simply and easily derived.

9 Claims, 10 Drawing Figures

CODING AND DECODING SYSTEM WITH MULTI-LEVEL FORMAT

CROSS REFERENCE TO RELATED APPLICATIONS

This application is a continuation of application Ser. No. 372,167 filed June 21, 1973, now abandoned, which is a divisional application of application Ser. No. 143,762 filed May 17, 1971 now issued as U.S. pat. No. 3,760,277.

BACKGROUND OF THE INVENTION

1. Field of the Invention

The field of this invention broadly relates to coding and decoding binary data. More particularly, the field of this invention includes communication systems wherein data is transmitted from point to point. The invention is useful for transmission of binary data in a converted form over any communication medium. Thus, this invention is applicable to transmission of data over twisted pair telephone lines, telephone links (including switching networks, microwave, etc.) leased lines, or over the air communication links such as, for example, high frequency radio or microwave systems.

2. Description of the Prior Art

Digital data transmission is a well-known art. Numerous techniques have been employed in order to convert digital data into coded forms which are believed to be optimum for the communication link being employed. As a typical example, digital data transmission over various communication links have been accomplished by phase modulation, amplitude modulation, or a combination of phase and amplitude modulation.

For purposes of simplicity in discussion, several system approaches will be discussed with strict reference to amplitude levels. It should be understood at the outset, however, that the principles discussed herein are equally applicable to phase and other modulation forms in either baseband or carrier systems.

Certain accepted principles have been adopted in known digital data encoding and decoding schemes. These accepted principles have been considered inviolable prior to this invention. Thus binary data to be transmitted over any communication link in the prior art has the number of bits integrally related by a whole integer such as 1, 2, 3, 4, etc., to the encoding period that is occupied by the binary data to be transmitted. For example, in a two level system, a non-return-to-zero change (NRZC) binary data string of ONES and ZEROES in a random sequence is shown in row A of prior art FIG. 1. In this NRZC format a binary ZERO occupies an entire encoding period $E.P._1$ as a low level, whereas a binary ONE occupies an entire encoding period (such as $E.P._5$) as a high level.

Figure 1:
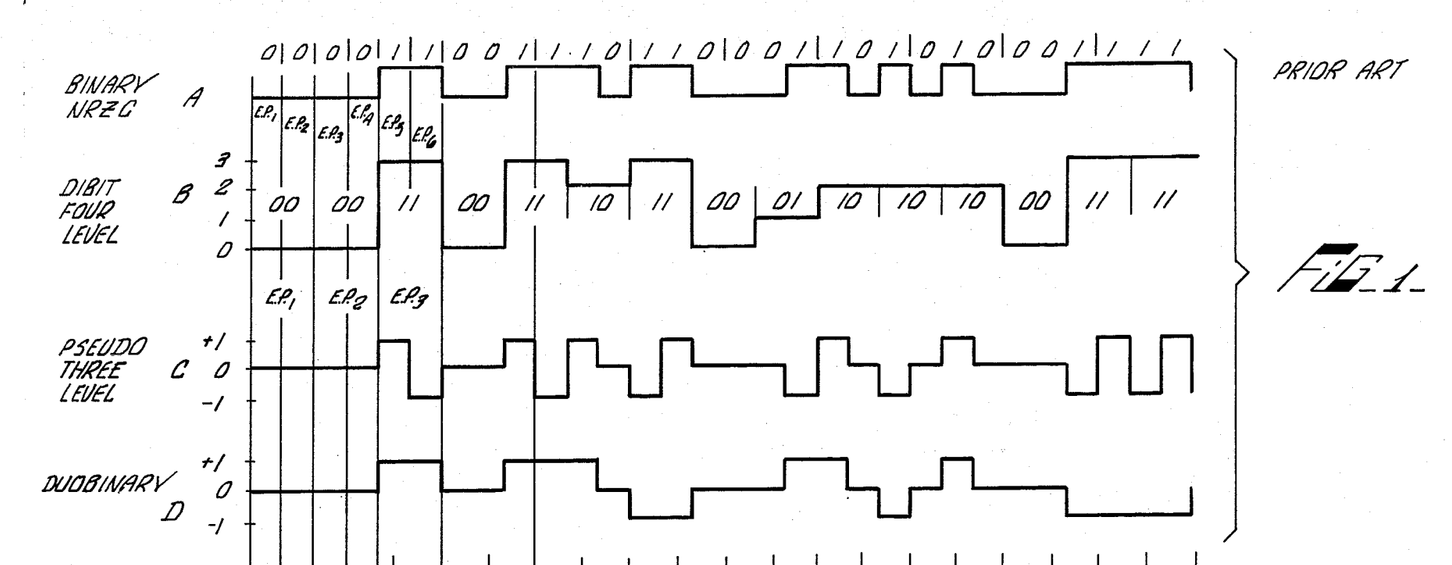
FIG. 1 depicts prior art formats for a random sequence of binary data. Row A depicts NRZC data. Row B depicts four level dibit data. Rows C and D depict two different versions of three level binary data.

Because of the high data transmission speed required for today's communication systems, it is known in the art to group serial binary data into various multi-bit groups and transmit the groups of information during an appropriate encoding period. For example, row B of FIG. 1 shows the incoming binary data grouped in pairs of bits, referred to as dibits. There are four possibilities for such dibit pairs, namely 00, 01, 10, 11. In such a system, four levels are required in order to amplitude encode the four possibilities.

In row B of FIG. 1, the dibit pair 00 is arbitrarily assigned a zero level and is grouped as one signal level in encoding period $E.P._1$. The dibit pair 01 is assigned a first level, the dibit pair 10 a second level and the dibit pair 11 a third level. The bandwidth required for dibit transmission of row B is one-half of the bandwidth required for the two level amplitude encoding of row A.

In all systems discussed herein, the number of encoding periods per second is known in the art as a baud rate for the system. For example, in the straightforward binary format of row A, one bit occupies a full encoding period. If the incoming data is at a speed of 4800 bits per second, row A depicts a 4800 baud rate system. Many individuals simply refer to such a system as a 4800 baud system.

In row B, on the other hand, two binary bits or dibits occupy each given encoding period as contrasted with the one bit per encoding period for row A. If it is assumed that the incoming data is at a speed of 9600 bits per second, the four level format of row A allows two bits to occupy each encoding period. Thus row B, (even though the data speed is doubled) is still referred to as a 4800 baud system, because there are 4800 encoding periods per second. In fact, all known prior art coding and encoding formats disclose what has heretofore been considered an inviolable rule that the number of bits to be transmitted in any encoding period is always related to that encoding period by a whole integer. For simplicity's sake, the relationship between the number of bits to their encoding period will be termed a bits-to-baud ratio. Applying this definition to the prior art systems of rows A and B means that the NRZC format of row A has a bits-to-baud ratio of 1, whereas the four level format of row B has a bits-to-baud ratio of 2.

Rows C and D depict two known prior art three level systems. These systems are subject to the same rule that the bits-to-baud ratio is a whole integer, namely 1. Row D is referred to as a duobinary format. In a duobinary format the encoding rule simply states that a binary ZERO always occupies a zero level. A binary ONE, on the other hand, always occupies a plus level or a minus level. Adjacent binary ONES hold the plus or minus level depending upon whether or not the number of preceding ZEROS were even or odd.

Duobinary encoding format has been claimed by some that it lowers the bandwidth of the energy spectrum. However, it still requires a bandwidth of ½T where T is the encoding period. This requirement on bandwidth is in accordance with the well-known Nyquist rule. It should be noted that the duobinary format has the same bit-to-baud ratio as the NRZC binary format.

In row C an alternative three level prior art system is shown. The rule of this prior art system is that a binary ZERO always occupies a zero level whereas binary ONES alternate from a plus one value to a minus one value. Again, in this format the bit-to-baud ratio is exactly the same as for the NRZC format of row A.

All of the prior art formats discussed above possess certain advantages and certain disadvantages, based on a figure of merit which may be assigned to each system format. In every instance wherein digital data is transmitted by a transmitter to a receiver over a communication link, people skilled in the art are concerned with many different factors. Of primary concern for any given format are the required bandwidth, the signal-to-noise ratio and the tolerance to peak-to-peak phase jitter. There are, of course, other considerations such as signal distortion due to amplitude, delay variation, and frequency translation which must be taken into consideration. Each of the prior art formats discussed above represents tradeoffs in these various noise problem areas, but my format truly presents a remarkable compromise in all of these primary factors by deviating from the preconceived concept that the bits-to-baud ratio must be a whole number. In my system format the bits-to-baud ratio is a mixed number and I achieve improved performance in baseband and in carrier systems as well. Baseband transmission is utilized in local distribution, wherein data is transmitted and received from point to point over hard-wire such as twisted copper pairs of a telephone line.

Repeaters in local distribution systems are placed very closely together in such hard-wire lines so that the prior art formats may be continually reshaped without loss of the signal levels which represent encoded binary data. Such close spacing is required because the prior art formats require a broad bandwidth in comparison with my invention's narrower bandwidth.

Since my coding format reduces the bandwidth requirements the close spacing of repeaters for prior art formats is no longer necessary.

Additionally, my system format is very suitable for telephone link transmission, (i.e., including switching networks, microwaves, etc.). It has a signal-to-noise ratio better than the signal-to-noise ratio shown for the four level systems of row B of FIG. 1. Its tolerance to peak-to-peak phase jitter (in a carrier system) is several times improved over the four level system. At the same time it offers extreme flexibility in that the direct current level that is placed on a telephone line may be zero which is highly desirable for simplicity in alternating current coupling the signal to a twisted pair telephone line for local distribution.

In some instances, of course, it is desirable to place a direct current signal on the line in an encoded format. In such an event it is a simple matter in my system format to provide this capability without expensive equipment modification. Furthermore, I have provided a system capability which will transmit data with at least a 50% increase in speed over the two and three level systems of the prior art while using the same bandwidth as these prior art systems because the bit-to-baud ratio I employ is a whole number and a fraction, as will be described in more detail hereinafter.

SUMMARY OF THE INVENTION

My invention converts multi-bit groups of binary data into a coded format in which the bit-to-baud ratio is a mixed number, i.e. an integer and a fraction, as opposed to the prior art wherein the bit-to-baud ratio is related to the binary data by a whole integer. In a preferred embodiment of my invention, I have relied upon two Trits of a ternary (or three level) format which represents nine possibilities. Eight possible binary combinations are formed from the multi-bit groups available by three binary bits per group. I have designated my preferred format as "trinary" and each signal level in my format within an encoding period as a "Trit". A pair of adjacent Trits identifies all eight possible combinations of three binary bit groupings.

By its very nature, a ternary format has three separate kinds, or values, and thus two of them offer $3^2$ or nine possibilities. All known prior art ternary approaches have failed to appreciate that these nine possibilities can be employed as a format for the eight possibilities required in groupings of three binary bits.

I have further discovered that my trinary format offers numerous advantages. As one advantage, one can choose whether or not a direct current component is present in the trinary formatted signal, which represents a series of random binary data sequences. As another advantage, proper selection of the unused possibility for the trinary format provides a signal form over a long-term sequence of random data from which a decoding clock signal can be derived in a simple and reliable manner without having to add an extra pilot tone to recover the clock in the receiver. The clock information derived by this encoding system provides not only the information as to when to sample the data but also the timing information as to which two Trits form a pair. This additional timing information assures recovery of a proper sequence of Trit pairs. As a third advantage, the unused possibility in my trinary format provides a self-checking error detection possibility in that when a forbidden possibility occurs, the decoder is designed to automatically emit an indication that an erroneous signal has been received. I have further provided in my invention, means responsive to the erroneous signal combination for emitting a three bit binary grouping that has a high mathematical probability of being the correct signal that was originally transmitted. This unusual advantage has improved the error rate for my system format over and above that of prior art systems.

As described above, I employ to full advantage a ternary format for transmission of multi-bit groups of three binary bits. My investigation of the prior art discloses that I have departed from techniques which have long been considered standard in the art of data transmission. In addition to a marked departure from the three level systems of the prior art discussed in FIG. 1, it is interesting to note that the Bell Telephone System provided in the SAGE (semi-automatic ground environment) equipment, a ternary system for transmitting binary data. In that system the maximum level was used only as a framing signal and the two lower levels were utilized to carry binary information. This SAGE system has been described in textbooks since its development in the late 1950's. Ironically such a system fails to utilize two-thirds of the data transmission capability offered by my trinary format. Furthermore, the figure of merit of the SAGE and other three level systems are far less acceptable than is the figure of merit for my trinary format invention.

BRIEF DESCRIPTION OF THE DRAWINGS

FIG. 5 depicts a group of waveforms useful at the receiver of FIG. 4 to derive a sampling clock to sample the Trit pair received over a communication medium.

DESCRIPTION OF THE PREFERRED EMBODIMENT

Prior to describing the techniques of a preferred embodiment of my invention in more detail, certain definitions as used hereinafter are considered in order.

Ternary code is a known code consisting of any one of three distinct kinds of values such as, for example, positive amplitude, zero amplitude or negative amplitude; or 60° phase, 180° phase, 300° phase, etc.;

Baud rate for a system is a unit of signalling speed which is based upon the number of encoding periods per second at an encoder;

Trinary format is a signal format for representing the eight possibilities of a group of three binary bits as a pair of three signal levels assigned to adjacent encoding periods;

A bit-to-baud ratio is a number which expresses the number of binary bits, the value of which is either completely or at least partially identified by a given signal condition during an encoding period;

A Trit is a signal condition in a trinary format which signal condition has a 1.5 bit-to-baud ratio;

A Trit pair refers to two adjacent Trits occupying adjacent encoding periods and both having a bit-to-baud ratio of 1.5;

A mixed number bit-to-baud ratio is a ratio in which at least one binary bit and a fraction thereof is assigned to a given encoding period.

Figures 2, 3:
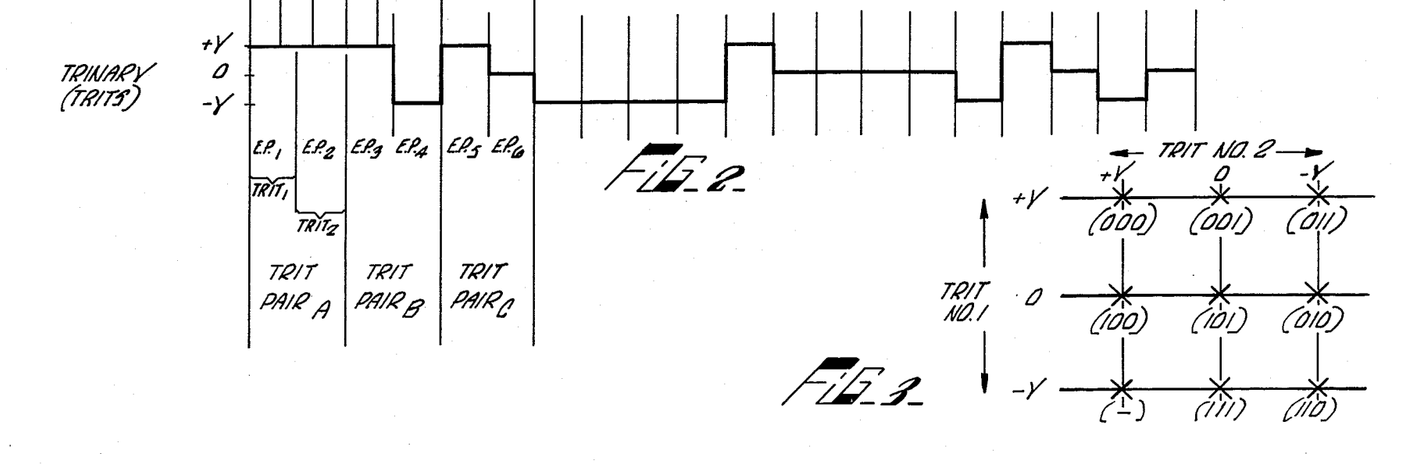
FIG. 2 depicts one data format (trinary) as a preferred embodiment of this invention.
FIG. 3 is a Trit pair matrix depicting one possible assignment of the multi-bit groupings of eight possibilities required for three binary bits together with one of the unused (for data) nine possibilities afforded by my trinary format.

With these definitions understood, reference is now made in detail to FIG. 2 which depicts the trinary format of my invention. Although there is no simple rule to express my trinary format, its waveform may be understood by reference to the eight possibilities required to represent the various combinations of three binary bits in a three bit grouping. The eight different combinations that three successive binary bits can possess are: 000, 001, 010, 011, 100, 101, 110 and 111. These eight possibilities are placed in parentheses at eight of the nine matrix intersection points shown in FIG. 3. In FIG. 3, each Trit is capable of assuming any one of the three levels shown simply as 0, +Y and −Y. Binary to trinary conversion may be explained by reference to the Trit pairs and the random string of binary bits of row A of FIG. 1. The first grouping of three binary bits to appear in row A is the binary combination 000. Reference to FIG. 3 shows that two Trits are required to represent 000. Trit No. 1 ($Trit_1$) is a +Y, and Trit No. 2 ($Trit_2$) is a +Y. This Trit $Pair_A$ is shown as two +Y levels in adjacent encoding periods $E.P._1$ and $E.P._2$, FIG. 2. Together Trit $Pair_A$ represents the combination of binary bits 000. Thus in each encoding period the bit-to-baud ratio is 1.5 in that two encoding periods share in the identification of a group of three binary bits, 000.

The next group of three binary bits in row A is 011 occupying the upper right-hand corner of the matrix of FIG. 3. Accordingly in encoding period $E.P._3$, $Trit_3$ is a +Y level and $Trit_4$ is a −Y level. In my trinary format of FIG. 2, I have now represented two combinations of the eight possible combinations shown in three bit groupings in the matrix of FIG. 3. Trit $Pair_C$ represents the binary combination 001 which is located at row 1, column 2, in the matrix of FIG. 3. Of this Trit $Pair_C$, $Trit_5$ (during encoding period $E.P._5$) is a +Y level, and $Trit_6$ ($E.P._6$) is a zero level. In a similar manner, the remaining possibilities are selected from the matrix of FIG. 3 to form the various signal levels of my trinary format as shown in FIG. 2.

At this point it is perhaps useful to examine a numerical value for the incoming string of random binary data for a clearer understanding of the trinary format of my invention. If it is assumed that the random string of binary data of row A of FIG. 1 is 9600 bits per second, then each signal level representing a binary ZERO or a binary ONE in the NRZC format of row A, FIG. 1, occupies a time interval for each encoding period of one second divided by 9600 bits. Thus each encoding period is approximately 104.17 microseconds.

For the four level format of row B, dibit pairs occupy each encoding period. Accordingly at an input data rate of 9600 bits per second only 4800 encoding period are required. Each encoding period is thus approximately 208.33 microseconds. The four level system of row B, FIG. 1, is a 4800 baud system. If I employ the same encoding period as the 4800 baud system of row B, FIG. 1, for my trinary format having a bit-to-baud ratio of 1.5, I can transmit 7200 bits per second.

Stated in other words, I have improved the data speed over the two level format of row A and the three level formats of rows C and D by 50% with a much reduced bandwidth. In fact, by using the same duration encoding periods as the four level systems of row B (4800 baud) I transmit 7200 bits per second in a three level system which has a figure of merit in comparison with these prior art systems that is a truly remarkable compromise between all system factors involved.

At this point, the figure of merit for these comparable systems, used with a carrier, is discussed so that the advantages of my invention may be further appreciated. Assume that the NRZC format of row A of FIG. 1, the four level format of row B of FIG. 1, and my trinary format of FIG. 2, are all operating as 4800 baud systems.

For the purposes of comparison of the above-mentioned systems, we will assume that each system is subjected to impairments (noise, etc.) to create an error rate of approximately $1 \times 10^{-6}$ or one error in one million bits transmitted and received. The signal-to-noise ratio for an NRZC format would be approximately 16 decibels. It would exhibit a tolerance to peak-to-peak phase jitter of about 35°. Thus its tolerance to phase jitter is high, and its signal-to-noise ratio is very acceptable on noisy lines. However, this format of row A of FIG. 1 only transmits 4800 binary bits per second. The four level format of row B of FIG. 1 would transmit 9600 bits per second at a similar error rate, but would require a signal-to-noise ratio of 26 decibels. This signal-to-noise ratio is marginal on noisy lines. The phase jitter for the four level system of row B of FIG. 1 is only about 8° peak-to-peak. This means that such a system is extremely sensitive to phase jitter and noise. My trinary format of FIG. 2, however, represents a truly remarkable compromise in that I can transmit 7200 bits per second in a 4800 baud system with very acceptable signal-to-noise ratio and tolerance to phase jitter commonly encountered on any telephone links. My system exhibits a tolerance of about 20° peak-to-peak phase jitter and it has a signal-to-noise ratio of approximately 21 decibels. Such performance with my high transmission rate of 7200 bits and my high figure of merit has not heretofore been recognized for any three level system of the prior art.

With the general inventive concepts fully described, the principles of my invention will now be discussed in a baseband system environment. A baseband system, as shown in block diagram in FIG. 4, includes a transmitter 50 connected to a receiver 100 by a hard-wire 30 (twisted pair telephone line). A binary data source at input 11 at transmitter 50 supplies binary data via scrambler 10, in normal NRZC format such as is shown in row A of FIG. 1, to a binary to trinary converter 15 of my invention. A clock source may be located at the transmitter 50. A clock signal at input 9 is from the binary data source or it may be associated with the binary to trinary converter 15, or it may be an entirely independent timing source synchronized with the data depending upon various system applications. The output of the binary to trinary converter 15 for a baseband system is normally applied to a low pass filter 25.

Figures 4, 6:
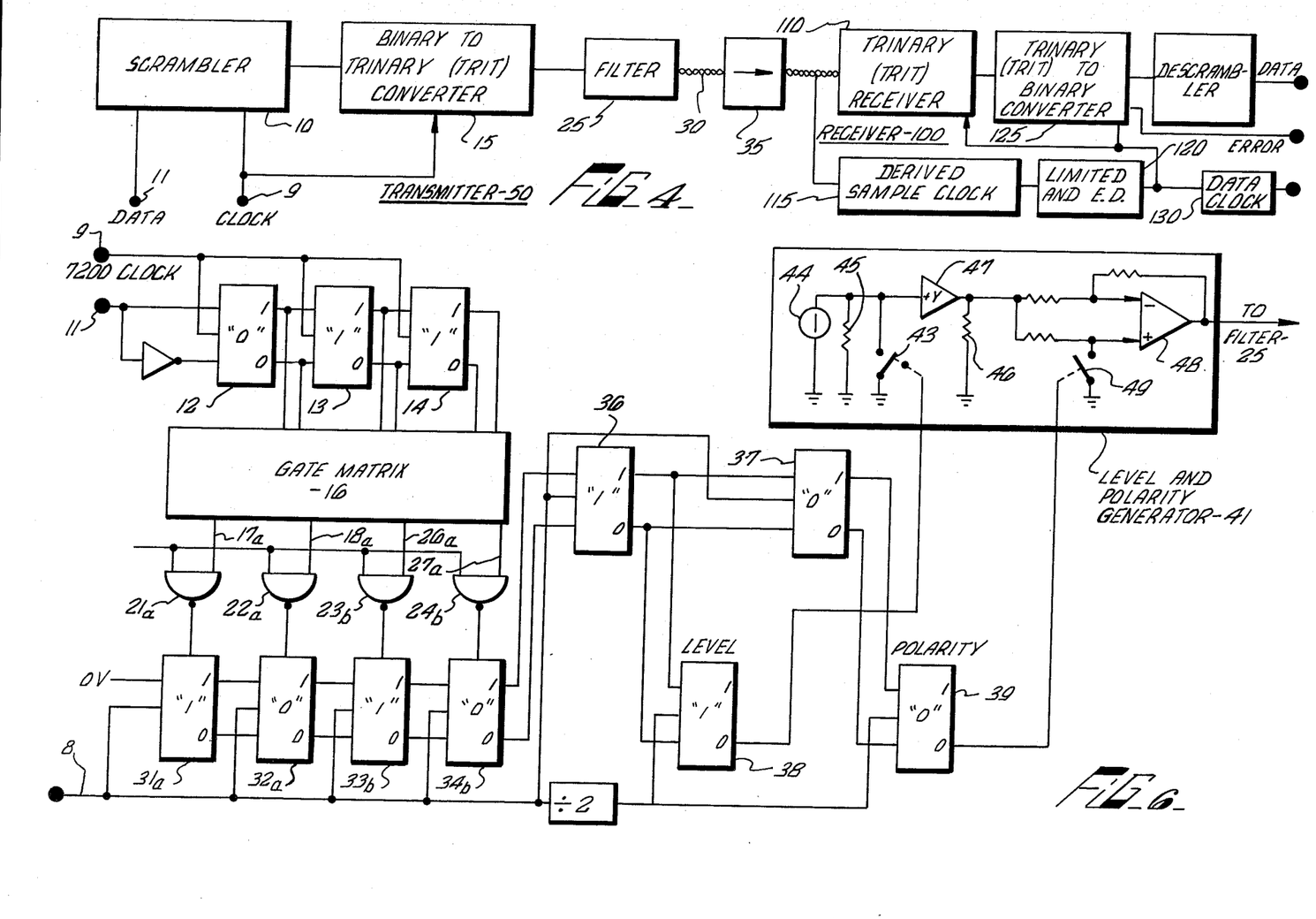
FIG. 4 depicts the use of the trinary format of my invention in a local distribution system utilizing a transmitter and a receiver connected by a twisted pair copper telephone line as a typical communication line.
FIG. 6 depicts in logic and block diagram form a preferred binary to trinary encoder of my invention.
Figure 6:
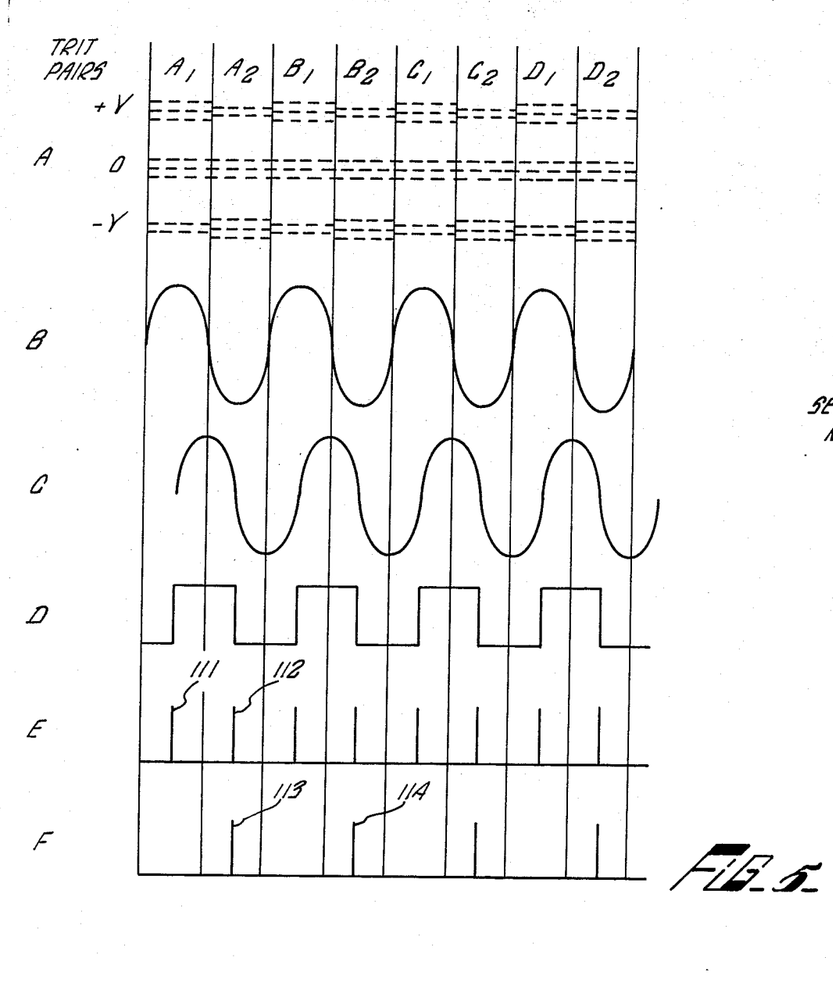

Filter 25 removes high frequency components from the rectangular wave as is normally done in all baseband systems. Such a filter prevents interference with other services which may use the same hard-wire communication line 30 and also prevents cross-talk from other channels which may be closely associated with the hard-wire line 30. In my assumed example of 7200 binary bits per second (at a 4800 baud rate) the filter 25 would pass 0 to 2400 cycles. 2400 cycles is the bandwidth for my trinary format based upon Nyquist's well-known criterion.

Connected in the hard-wire link 30 are a number of repeaters 35. Each repeater 35 would consist of my receiver 100 and my transmitter 50. Since the bandwidth for my trinary system has less high frequency content than prior art three level systems, the repeaters of my invention for local distribution may be placed further apart than in the prior art systems.

Connected at the end of the hard-wire communication line 30 is receiver 100. Receiver 100 includes a trinary receiver 110 which may take the form of any known shaping circuit to restore the analog waveform on line 30 to the three level square wave Trits shown in my trinary waveform of FIG. 2. A derived sample clock 115 is also connected to receive the waveform from communication line 30. This derived sample clock 115 and the limiter and edge detector (E.D.) circuit 120 yields an output signal which is precisely timed at the center of the encoding periods for each Trit so that the signal level for each Trit may be sampled and identified.

In order to understand fully the operation of the derived sample clock system for my invention, it is necessary to recall that in FIG. 3, one possibility, namely $-Y, +Y$, was not utilized for data. The elimination of the $-Y$ and $+Y$ combination for any Trit pair positively assures that at the transmitter 50 there will be no transition of a $-Y$ level to a $+Y$ level in adjacent Trits of a Trit Pair. Reference is made to FIG. 5 which is a waveform useful in understanding the derived clock system of my trinary format. The trinary format is repeated at row A of FIG. 5 with Trit Pairs shown simply as $A_1 A_2$, $B_1 B_2$, $C_1 C_2$, and $D_1 D_2$. The levels for these Trits are shown dashed to represent by row A a long-term average of the possibility of assigned signal levels occurring in a random sequence of Trit Pairs. Compare the possibilities in the matrix of FIG. 3 for Trit No. 1. In row $+Y$ and $0$ each has a possibility of occurring three times out of eight possibilities. These three times are shown in FIG. 5, row A, as three dashed lines for $+Y$ and three dashed lines for $0$. As far as row $-Y$ in the matrix of FIG. 3 is concerned, Trit No. 1 occurs only two times out of eight possibilities. Thus it is shown in FIG. 5 as having only two dashed lines. Accordingly the average voltage for the first Trit of each and every Pair is positively weighted over a long-term average. In contradistinction, however, in Trit No. 2 of each Trit Pair, the matrix of FIG. 3 shows that a $-Y$ and a $0$ level can each occur three times out of eight possibilities (again shown by three dashed lines in FIG. 5). A $+Y$ in the Trit No. 2 can occur only twice for the eight possibilities (again shown by two dashed lines in FIG. 5). Thus over a long-term average the second Trit of each and every Trit Pair has an average voltage which is negatively weighted. If such a format is placed on a spectrum analyser, a strong 2400 cycle per second signal can be seen. The surprising result is that the trinary format presents a predominant frequency content which is equal to ½T, where T is the encoding period. The frequency in the example assumed for my preferred embodiment for the 1.5 bit-to-baud ratio is 2400 cycles per second for 7200 bits per second. Row B depicts such a 2400 cycle per second sinewave.

Derived sample clock 115 at receiver 110 may be any well-known type of circuit which will respond to the 2400 cycle signal. For example, it may be an oscillator tuned at 2400 cycles per second. As an alternative it may be any known bandpass filter having a center frequency located at 2400 cycles which filter exhibits a 90° phase delay in the 2400 cycle waveform. Row C in FIG. 5 depicts the 2400 cycle per second sinewave of row B delayed by 90° at the filter output if it is employed as the derived sample clock 115 at the receiver 100, FIG. 4.

Limiter and edge detector circuit 120 of any well-known type squares the phase delayed 2400 cycle per second sinewave of row C and the output of limiter portion of circuit 120 is the squared waveform shown in row D of FIG. 5. By utilizing both a leading and a trailing edge detector for the 2400 cycle per second square wave of row D of FIG. 5, circuit 120 emits a 4800 cycle per second sample clock, row E. Each sample pulse, such as sample pulses 111, 112, etc., are thus located precisely in the center of each Trit to be decoded.

It is, of course, necessary that each Trit Pair be properly grouped in order to avoid errors and ambiguities in the Trit Pair binary to trinary converter 125, FIG. 4. My clock signal inherently has the capacity of making certain that proper Trit Pairs are grouped together so that once the amplitude levels have been sampled by the sample pulses of row E, FIG. 5, proper conversion to a binary grouping takes place. This timing information is yielded for example by a negative going edge detector which yields pulses 113, 114, etc., as shown in row F of FIG. 5. The pulses 113, 114, etc., are utilized to gate out the binary grouping in accordance with a truth table for the converter 125 to be discussed hereinafter in TABLE I.

The trinary to binary converter 125 receives the sample pulses and restores the three amplitude levels of the trinary waveform back to binary data. Thus for the first two sample pulses 111 and 112 of row E of FIG. 5, (assuming the data pattern of FIG. 2), two +Y levels are detected. The trinary to binary converter decodes these two Trit levels as a three bit binary group 000. This decoded bit group 000 is emitted at the data rate of 7200 bits per second. A data clock generator 130 which is phase locked in any well-known manner to the output signal from limiter and edge detector circuit 120 yields a suitable 7200 cycle data clock to the utilization circuitry connectable to the receiver 100.

Since the trinary to binary converter 125 is essentially the inverse of the binary to trinary converter 15, FIG. 4, only circuit 15 will be shown in logic diagram form. In table form, however, the truth table for all nine possible Trit Pairs together with their associated binary outputs is shown in TABLE I:

TABLE I

| | NINE POSSIBLE TRIT PAIRS | | BINARY OUTPUT GROUPINGS |
|---|---|---|---|
| | $Trit_1$ | $Trit_2$ | |
| | +Y | +Y | 000 |
| | +Y | 0 | 001 |
| | +Y | −Y | 011 |
| | 0 | +Y | 100 |
| | 0 | 0 | 101 |
| | 0 | −Y | 010 |
| error → | −Y | +Y | (101) |
| | −Y | 0 | 111 |
| | −Y | −Y | 110 |

A point to be noticed from TABLE I is that when a forbidden possibility of a Trit Pair such as $Trit_1$ (−Y) and $Trit_2$ (+Y) occurs, any suitable error signal may be emitted by receiver 100. Upon detection of this forbidden combination of levels, an error lamp on a panel of the receiver 100 may be lit, or any other known error indication device may be activated.

Reference to TABLE I further shows that upon the detection of the forbidden possibility in a given pair of adjacent Trits, the decoder emits the combination of binary bits 101. Reference is made at this point to FIG. 3 which shows that the three bit grouping 101 is actually represented by a pair of Trit levels 00. In an actual system study, however, it turns out that most system noises that induce errors in my format result in a mathematical probability that the forbidden combination appeared when 100, 101, 111 were the real data combinations that had been transmitted by transmitter 50. They are the closest neighbors of the −Y, +Y matrix point in FIG. 3. Binary grouping 101 deviates by only one bit from either of its adjacent possibilities which are 100 and 111 in the matrix of FIG. 3 and it is identical to 101. By automatically sending out the binary combination 101 it is apparent that only one bit of the three bit groupings will be wrong, if, in fact, any bit at all is wrong. This technique has improved the error rate of my trinary system.

In the trinary system format of my invention, I have so far referred to the levels simply as a +Y or a −Y. It is desirable that these levels be as high a voltage as possible so that noise on the communication link is kept to a minimum deleterious effect. At the same time in many instances it is desirable that we prevent any direct current from being present in the Trit format for the reasons given hereinafter.

In a three level system the root means square (RMS) value may be found in accordance with the known formula for such system. With the mathematics completed for the format of the Trits as shown in FIG. 3. Y turns out to be a voltage level of ±1.265 for a root means square voltage of 1 volt. In the format disclosed in FIG. 3, we have six 0 levels and 10 Y levels as is evident by inspection of the matrix table in FIG. 3. If, on the other hand, we elect to use the level combination −Y and +Y for Trit No. 1 and Trit No. 2 and eliminate any other level possibility, say −Y, 0 for a Trit pair, then the trinary format has a definite and positive direct current value. This newly defined matrix still has a clock signal available.

This factor is of importance since some communication systems require direct current to be placed on the communication link. If such a direct current system is desired, it is a simple matter to reorient the Trit matrix of FIG. 3 in the manner just indicated so that my format has all the advantages listed hereinabove.

Figure 7:
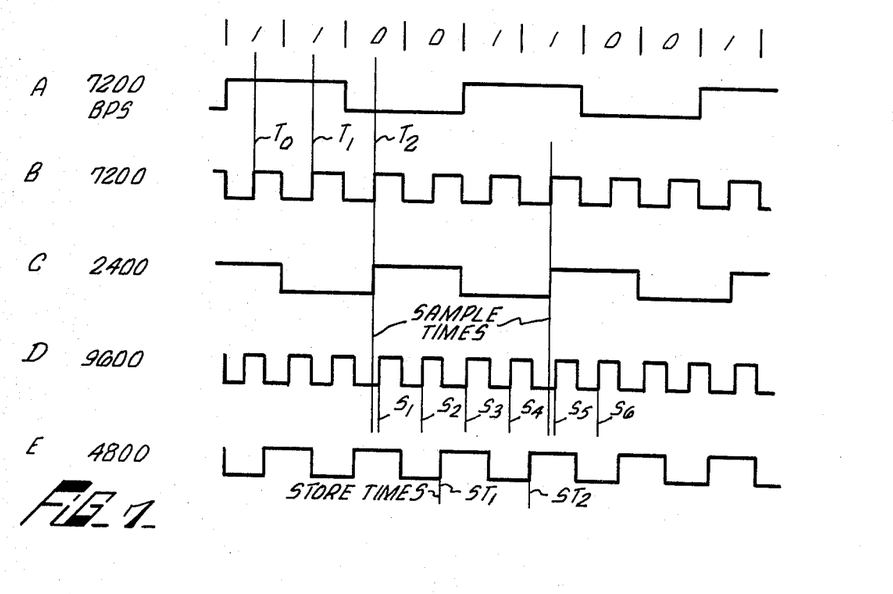
FIG. 7 depicts a timing waveform useful in describing the logic diagram of the gate matrix shown in block form in FIG. 6 and in logic form in FIG. 8.

The basic logical encoding operation for encoder 15 of FIG. 4 will be more fully appreciated by reference to FIGS. 6 and 7. In FIG. 6 assume for purposes of example only, that the input NRZC binary data speed is 7200 bits per second as shown in row A of FIG. 7. Such data is received at input terminal 11, FIG. 6. Three binary bits (for example 110) are clocked by the leading edge of the 7200 cycle per second clock waveform, row B, FIG. 7, into the three shift register stages, 12, 13 and 14. This 7200 cycle data clock is received at input terminal 9. Gate matrix 16 is connected to the binary indication leads of shift register stages 12, 13 and 14. For purposes of description of this invention, negative logic is depicted as typical although obviously positive logic would serve equally well. Accordingly, shift register stages 13 and 14 at clock times $T_2$ supply HIGH levels to the gate matrix 16, while shift register stage 12 supplies a LOW level. Connected to the output of gate matrix 16 are four NAND gates. These four NAND gates are grouped in two pairs. One pair consists of NAND gates 21a and 22a, and the other pair consists of NAND gates 23b and 24b. Each NAND gate has two input leads, one input of which is a 2400 cycle per second clock of row C, FIG. 7. This 2400 cycle per second clock may be provided by dividing the 7200 cycle per second data clock by a divide-by-three circuit. As an alternative, of course, the 2400 sample clock may be generated by any suitable timing device which is synchronized with the input data rate. As shown in FIG. 7, the sample time occurs after all three binary bits have been stored into the shift registers 12, 13 and 14, and their binary values have been supplied to gate matrix 16.

Gate matrix 16 and the associated pairs of NAND gates 21a, 22a and 23b, 24b thereof, may be considered a three to four encoder, in that the binary bit grouping 110 must be converted into a pair of trinary signals at a different baud rage (4800) than the input data rate 7200 bits per second. Accordingly when the three binary bits are stored in registers 12, 13 and 14, these bits are decoded as two pairs of signal levels emitted from gate matrix 16. For example, at output lead 17a associated with NAND gate 21a, either a HIGH level or a LOW level will be supplied. Similarly at output lead 18a, a HIGH or a LOW level will be supplied. The level present at lead 18a indicates the polarity to be applied in the event that the level present at 17a is encoded to be a ONE. At output lead 26a, in a similar manner, an output level will be emitted which is indicative of either a ONE or a ZERO. Output lead 27a will also emit a HIGH or a LOW output level which is indicative of the polarity to be assumed by the signal emitted from output lead 26a in the event it is encoded as a ONE.

The output levels emitted from NAND gates 21a, 22a, 23b and 24b are stored in four shift register stages 31a, 32a, 33b and 34b respectively associated with the NAND gates having similar subscripts.

Four register stages are required because in my format each Trit may have a Y level or a 0 level. If a Trit has a Y level, that Y level may have a plus or a minus polarity. Connected to input lead 8 is an intermediate shifting pulse signal for shifting the binary values stored in the four shift register stages 31a, 32a, 33b, 34b. This shifting signal is a 9600 cycle per second signal shown at row D, FIG. 7. It is synchronized with the other clocks in the system. Leading edge shifting is employed and the first four shift times are shown as $S_1$ through $S_4$.

As mentioned hereinbefore, the first grouping of three binary bits stored in registers 14, 13 and 12 was 110. Reference to FIGS. 2 and 3 discloses that $Trit_1$ requires a Y level of a negative polarity. Accordingly output lead 26a is HIGH and output lead 27a is LOW. At the first sample time, FIG. 7, NAND gates 23b and 24b supply a HIGH and a LOW level, or a ONE and a ZERO into shift register stages 33b and 34b as depicted in those stages for exemplary purposes. In a similar manner, reference to FIG. 3 shows that $Trit_2$ is also a negative Y level. Accordingly gate matrix 16 emits at lead 17a a HIGH level and at lead 18a a LOW level. Thus at the first 2400 sample time under consideration NAND gates 21a and 22a simultaneously supply to registers 31a and 32a a ONE and a ZERO respectively.

Shift register stages 31a, 32a, 33b and 34b are shifted at a 9600 cycle per second rate by shift pulses $S_1$ through $S_4$ in FIG. 7. The first ZERO and ONE present in stages 34b and 33b are transferred to stages 37 and 36 at the same instant that the ONE and the ZERO in stages 31a and 32a are transferred to stages 33b and 34b respectively. A 4800 cycle per second clock, row E, FIG. 7, is connected to a pair of LEVEL and POLARITY stages 38 and 39 respectively. The ONE and ZERO shown in stages 38 and 39 are those that were previously shifted into shift register stages 36 and 37 at shift times $S_1$ and $S_2$. At store time $ST_1$ at the 4800 cycle per second rate, these binary values are stored in LEVEL stage 38 and POLARITY stage 39. These stages 38 and 39 are connected to a level and polarity generator 41. Level and polarity generator 41 emits the Trit levels of my trinary signal format. The binary value (i.e., ONE or ZERO) stored in the LEVEL stage 38 either opens or closes switch 43, which switch may be any appropriate solid state switching device. A current source 44 is connected between ground and a resistor 45. Resistor 45 is either in the circuit or bypassed depending upon the open or closed condition of switch 43. The values of resistors 45 and 46 are selected to generate a +Y volt across resistor 46 when switch 43 is open. When switch 43 is closed, the voltage across resistor 46 is of course a zero volt. Assuming that a Y signal is present at the output of amplifier 47 this Y signal is applied to operational amplifier 48. Amplifier 48 polarizes the output from amplifier 47 to either a positive or a negative polarity depending upon the value of the binary bit stored in POLARITY stage 39. In the example under consideration a ZERO is stored in POLARITY stage 39. This ZERO closes switch 49 and thus serves to establish a −Y level at the output of generator 41. This −Y level is in turn applied to filter 25, FIG. 4. When the ONE and ZERO from stages 31a and 32a are shifted into the LEVEL and POLARITY stages 38 and 39 respectively, at store time $ST_2$, FIG. 7, the operation as just described results in the level and polarity generator 41 emitting another −Y value.

Figure 8:
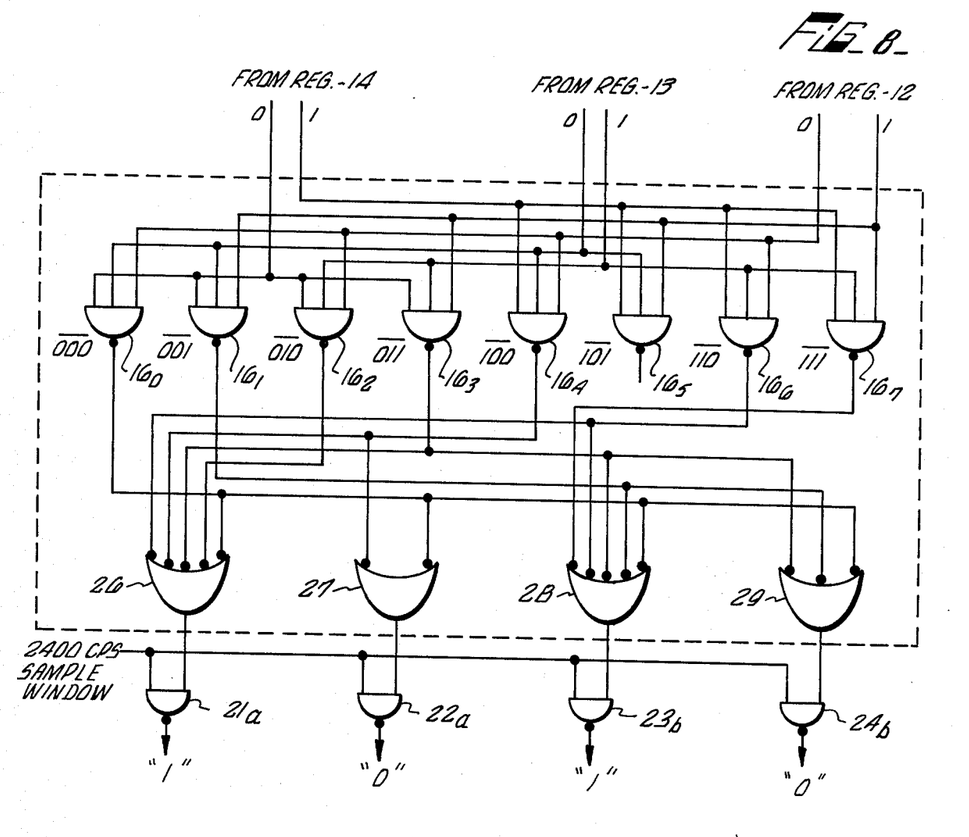
FIG. 8 is a logic form presentation of one possible configuration of a binary to trinary gate matrix.

FIG. 8 repeats a portion of the binary to trinary encoder shown in FIG. 6. In FIG. 8 the logical circuitry for the gate matrix 16 is shown in detail within the dashed outline numbered 16. It should be understood that the logic as there depicted is one typical example only and is not to be taken as limiting.

Gate matrix 16 includes eight NAND gates $16_0$ through $16_7$. Each NAND gates receives three input signals which input signals are derived from one and zero outputs from shift register stages 12, 13 and 14 as indicated. A ZERO stored in any register stage (12, 13, 14) means that the zero output lead from that register stage is true, and the one output lead from that register stage is false. A ONE stored in a stage means that the zero output lead from that register stage is false and the one output lead is true. The true and false conditions from the three stages 12, 13 and 14 result in three true inputs being applied to NAND gate $16_6$ which is the gate associated with the 110 grouping. Three true inputs to NAND gate $16_6$ result in a false output from that gate. All the other NAND gates $16_0$ through $16_5$ and $16_7$ have at least one true and one false input signal applied thereto. Accordingly their output leads are true.

Connected to the various NAND gates are four NOR gates numbered 26, 27, 28 and 29. These NOR gates in turn have an output lead which supplies one of the two given input signals to the four NAND gates 21a, 22a, 23b and 24b. NAND gate $16_3$ emits a false input signal which is applied to NOR gates 26 and 28, thereby rendering their output leads true. NOR gates 27 and 29, on the other hand, receives the true inputs, thereby rendering their output leads false. At the 2400 sample window time shown in FIG. 7 at row C (assuming a true is a high voltage level) gate pair 21a and 22a will emit a ONE and a ZERO respectively and gate pair 23b and 24b will also emit a ONE and a ZERO respectively. These binary values are shown in FIG. 8. It should be noted that NAND gate $16_5$ although depicted is not actually employed for connection to the NOR gates 26 through 29. When one examines the matrix of FIG. 3, however, it is apparent that the binary grouping 101 requires two zero levels, thus explaining the lack of connections for NAND gate $16_5$. Thus the absence of a false output signal from NAND gate $16_5$ at any of the NOR gates 26 through 29 assures false outputs from all of the NOR gates, thereby resulting at the sample time in a storage of all ZEROS in the four shift register stages 31a, 32a, 33b, 34b of FIG. 6.

Figure 9:
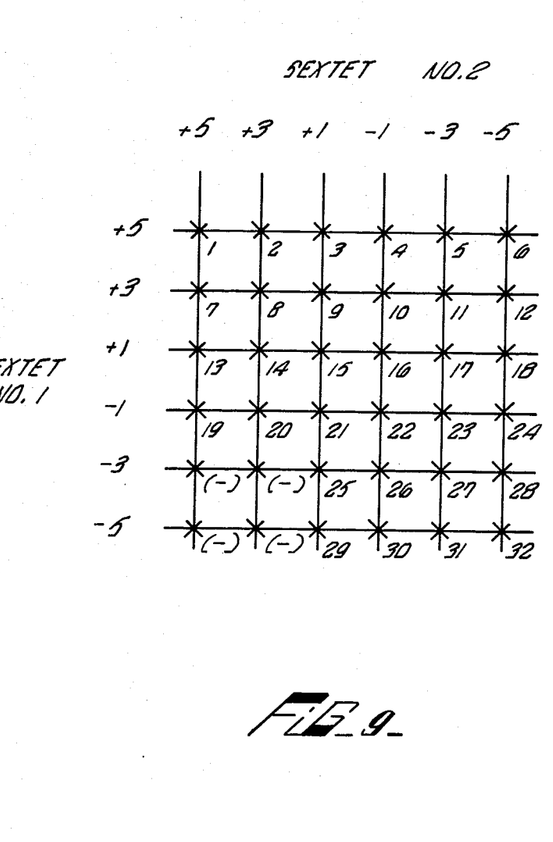
FIG. 9 depicts another six level format for a preferred embodiment of my invention.

Reference is made to FIG. 9 for a further exemplary embodiment of my invention. In accordance with the principles of this embodiment of my invention, the multi-bit group of serial binary data comprises five binary bits. Five binary bits yields 32 distinct possibilities. In order to encode the group of five binary bits a six level system is employed wherein a 6×6 matrix of the type shown in FIG. 9 supplies 36 possibilities.

Again, as is the case with the Trit Pairs, a pair of sextets is utilized in adjacent encoding periods in order to represent the five binary bits of each multi-bit grouping. This approach to my six level system means that the bit-to-baud ratio is 2.5. Accordingly an encoding period includes one sextet level that partially identifies two-and-one-half binary bits of a five bit grouping. The adjacent sextet no. 2 is an adjacent encoding period also assumes one of the six levels as designated by the matrix of FIG. 9, in order to represent the remaining two-and-one-half bits of the multi-bit groupings. My six level system yields four unused possibilities (36 possibilities minus 32 possibilities). These four possibilities may again be selected in such a manner that a sample clock may be derived at the receiver in a simple and reliable manner. The sextet system has all of the advantages mentioned hereinbefore with respect to the trinary system. For example, the unused possibilities provide for a self-detecting error mode in that whenever a certain forbidden combination, such as those shown by the straight lines in parenthesis in FIG. 9 do not occur in adjacent encoding periods, for a given sextet pair, an error detection lamp or other error signalling device may be energized. When the forbidden combinations occur, a likely five bit binary data will be generated as was previously described for my trinary case.

Utilization of my sextet code in a 4800 baud system with a bandwidth of 2400 cycles provides the capability of transmitting 12,000 bits per second. It should be noted at this point that certain of the Bell Telephone System equipment is presently being manufactured based upon an eight level format. My sextet format will yield better performance than an eight level system.

When eight levels are employed in the prior art, three bits are grouped together in a multi-bit group. The three bits yield eight possibilities and each possibility is assigned an encoding period with a bit-to-baud ratio of 3. TABLE II summarizes a primary distinction of my format approach over all known prior art approaches, based upon a 4800 baud rate.

TABLE II

| COLUMN A | COLUMN B | COLUMN C | COLUMN D |
|---|---|---|---|
| binary bits per second | prior art bit-to-baud ratio | Sang Whang bit-to-baud ratio | Level at the system |
| 4,800 | 1 |  | 2 |
| 7,200 |  | 1.50 | 3 |
| 9,600 | 2 |  | 4 |
| 10,800 |  | 2.25 | 5 |
| 12,000 |  | 2.50 | 6 |
| 13,200 |  | 2.75 | 7 |
| 14,400 | 3 |  | 8 |

In TABLE II the standard approach of employing a bit-to-baud ratio which is a whole number for various data input speeds is depicted (1, 2 and 3). In TABLE II in column A, the input data speeds for 4800 bits per second, 7200 bits per second, etc., up through 14,400 bits per second are shown.

In column B of TABLE II the bit-to-baud ratio or encoding periods utilized in the prior art at these various speeds is shown. Note that only three possibilities existed prior to my invention. As has been explained hereinbefore, such numbers, based on the prior art approach, are a whole number.

In column C my system format deviates from the prior art in that the bits-to-baud ratio is a whole number and a fraction as is apparent for the exemplary input data speeds of 7200 bits per second, 10,800 bits per second, 12,000 bits per second, and 13,200 bits per second. It is apparent from view of TABLE II that the sextet pair format described by the matrix of FIG. 9 and discussed hereinbefore provides the data rate of 12,000 bits per second with a 2.5 bit-to-baud ratio. The bit-to-baud ratios for five (10,800 bits per second) and seven level (13,200 bits per second) systems, as based on my invention format, is shown in columns C and D, TABLE II. These alternatives need not be described more fully, since their application will follow the matrix and level appointment already fully described for the three (7200 bits per second) and six (12,000 bits per second) level systems.

Figure 10:
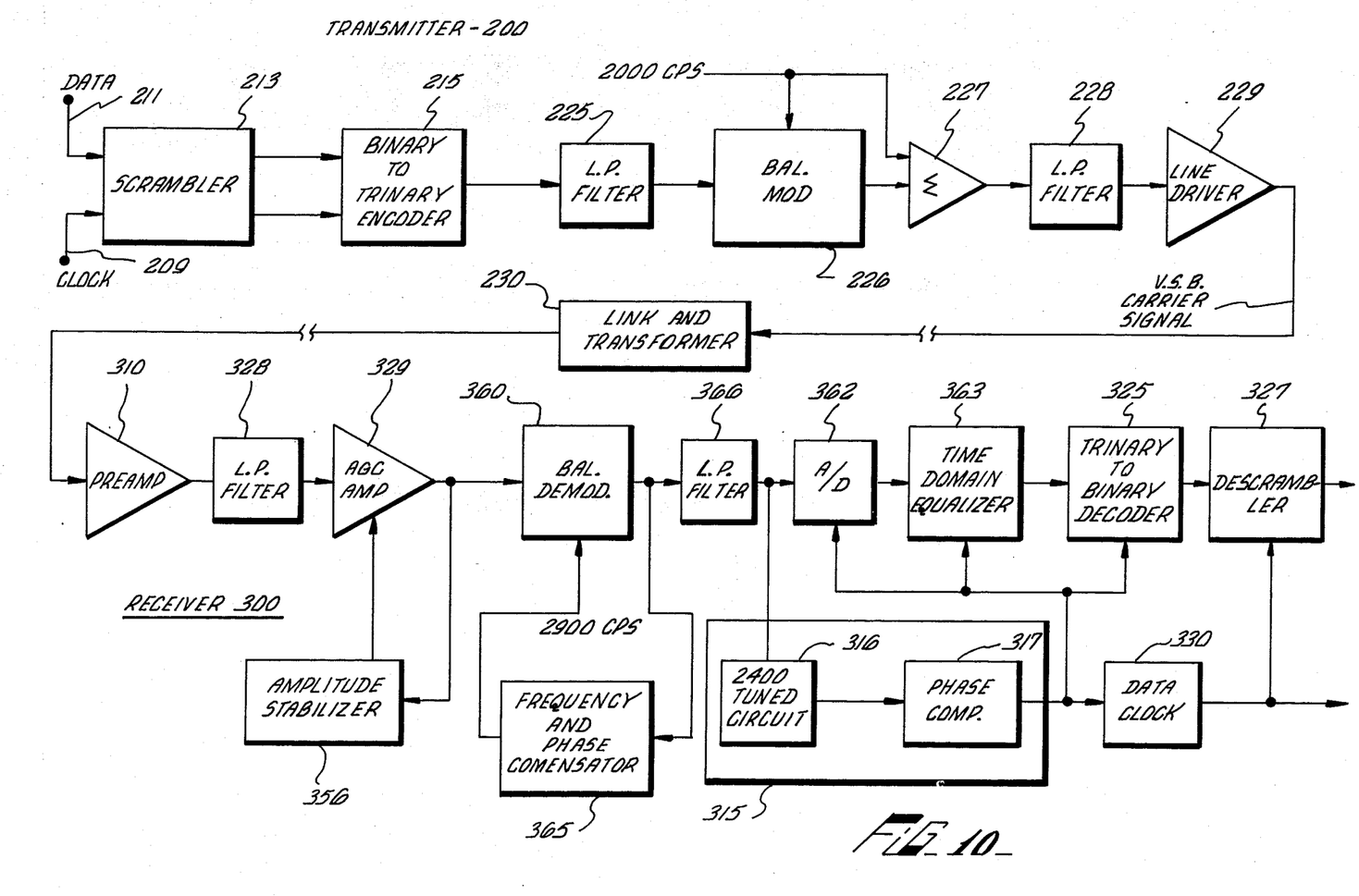
FIG. 10 depicts in block diagram form a carrier system for transmitting the code formats of my invention in a carrier system.

FIG. 10 depicts one illustrative embodiment of the application of the principles of my invention to a carrier system as distinguished from the baseband system discussed herein-before. In keeping with our assumed input data rate of 7200 bits per second, such data is supplied at input terminal 211 of transmitter 200. A 7200 cycle per second clock is applied at input lead 209. Both the data and the clock are scrambled by any well-known scrambler circuit 213. A scrambler circuit serves the well-known function of removing long strings of constant level binary signals to a predetermined pattern of mixed binary values. Thus if a long string of ZEROS, for example were present in the input data, scrambler 213 would change them into a mixed pattern of binary data which includes some alternating binary ONES and ZEROS.

A binary to trinary encoder 215, (connected to scrambler 213) of the type already described yields the Trit Pairs of my format at a 4800 baud rate. The bandwidth for a 4800 baud rate as discussed hereinbefore is 0 to 2400 cycles. Low pass filter 225 is connected to receive the Trit Pairs and remove any spurious high frequency signals above the upper 2400 cycles limit.

A balanced modulator 226 receives the filtered Trit Pairs and also receives a 2900 cycles per second modulating pilot tone. The 2900 cycles per second pilot tone in the balanced modulator 226 translates the 0 to 2400 cycle signal to a double sideband carrier signal having a frequency range from 500 cycles per second to 5300 cycles per second. The 2900 cycles per second modulating pilot tone is also applied to a summing amplifier 227 of any known type, which amplifier sums the pilot tone and the double sideband modulated Trit Pairs for application to a low pass filter 228. Filter 228 has an upper cutoff at 2900 cycles per second to remove the upper sideband (2900 cycles per second to 5300 cycles per second) and to remove all spurious high frequency components about 2900 cycles per second from the data modulated vestigial sideband carrier. An output signal from low pass filter 228, is applied by a line driver 229 to a communication link and transformer 230. The communication link may be a telephone link (microwave etc.) or a leased telephone link as typical examples.

A leased telephone link is adapted to receive the 500 to 2900 bandwidth signals from line driver 229. Connected to the telephone transmission link and transformer 230 is a receiver 300. The receiver 300 includes a preamplifier circuit 310, which may be any given amplifier to boost the signal received over the link 230 to its power level as initially established at transmitter 200. A low pass filter 328, having a cutoff frequency at 2900 cycles per second removes any spurious high frequency components above the desired bandwidth. An automatic gain control (A.G.C.) amplifier 329 is connected to the output of the low pass filter and an amplitude stabilizer circuit 356 is connected in a feedback loop for A.G.C. amplifier 329. This amplitude stabilizer circuit 356 may be any suitable stabilizer circuit known in the art, which circuit in the feedback loop keeps the power output from the amplifier 329 within a desired power range as assigned to the overall system.

A balanced demodulator 360 receives the vestigial sideband carrier signal containing the data from the A.G.C. amplifier 329 and also receives a demodulating pilot tone at 2900 cycles per second, which pilot tone is supplied by the frequency and phase compensator circuit 365. A suitable phase and frequency compensator circuit 365 is fully explained in a patent application assigned to the same assignee, filed Nov. 18, 1969, having Ser. No. 877,813, entitled "DATA MODEM HAVING PHASE, FREQUENCY AND AMPLITUDE DISTORTION COMPENSATING MEANS" (now issued as U.S. Pat. No. 3,644,830). The full description of the operation of the compensator circuit 365 is described in the above-identified patent. Briefly, however, the compensator circuit 365 samples the output signal from balanced demodulator 360 and correlates the output with any frequency and phase variations which may have appeared in the transmitted 2900 cycles per second pilot tone due to the telephone link and other circuit disturbances. When the demodulating pilot tone is properly phased an output signal from the balanced demodulator circuit 360 is translated down to a frequency between 0 and 2400 cycles per second. This signal from the balanced demodulator 360 is applied to a low pass filter circuit 366 which has a cutoff point of 2400 to remove any high frequency noise above that cutoff point. One suitable derived clock circuit according to the principles of this invention has already been described in connection with the baseband system. Another typical and suitable derived clock circuit 315 is shown in this carrier system of FIG. 10. It includes a circuit 316 which is tuned at 2400 cycles per second. The 2400 cycle per second output signal from circuit 316 drives a known phase compensator circuit 317 which changes the phase of the 2400 cycles per second signal by 90° (see FIG. 7). Thus again a 4800 pulse per second sample clock may be easily and simply derived by Limiters, edge detectors and the like. The output sample clock at 4800 pulses per second samples the Trit Pair signal values in a known analog to digital circuit 362. Each sampled signal level for the Trit Pairs may thus be identified as +Y, O or −Y. Connected to the output of the analog to digital converter 362 is a time domain equalizer 363. Such time domain equalizers are well-known in the art. Such equalizers reorder the digital levels applied to the input by the analog to digital converter 362 so as to provide further compensation for any noise disturbances that may have degraded the sampled levels. Accordingly, the true amplitude level values of a Trit Pair are emitted from equalizer 363 to a trinary to binary decoder 325. This decoder operates in the same manner as the trinary to binary converter described in the baseband system earlier. Reference to the truth table of Table I depicts the binary output signals from decoder 325. A data clock is made available to utilization circuitry and to a descrambler circuit 327 with a 7200 cycles per second output data clock circuit 330. The descrambler circuit 327 is the complement of the scrambler circuit 213 at transmitter 200, and it places the decoder binary groupings into their original data format which was originally received at input terminal 211 at transmitter 200. The data at the output of descrambler circuit 327 is thus made available to the utilization circuitry.

It is to be understood that the foregoing features and principles of this invention are merely descriptive, and that many departures and variations thereof are possible by those skilled in the art, without departing from the spirit and scope of this invention.

What is claimed is:
1. A data transmission system wherein a random binary data stream is encoded for placement on a transmission line, said system comprising:
   means for grouping every three bits of said binary data stream into a three bit word:
   means for encoding said three-bit words by assigning two signal levels out of a set of three signal levels, each signal level having a duration of one encoding period, to each of said three-bit words, the relation between the signal levels in one three-bit word and the binary bits in that word being defined by a 3 × 3 matrix, said matrix representing three signal levels and nine unique groups of two of said three signal levels, a particular eight out of the possible nine unique two signal level groups being chosen to cause the first encoding period in every three-bit word to maintain an average energy level that is oppositely weighted from the average energy level of the second encoding period, thereby producing a plurality of encoded three-bit words, each word represented by two signal levels, a stream of such signal level groups exhibiting a cyclically varying signal characteristic having a frequency of ½T, where T is the time duration of one encoding period;
   means for applying said stream of signal level groups to said transmission line;
   means sampling the signal levels on the transmission line at a receiving end thereof, for generating a clock signal synchronized to the cyclically varying signal characteristic thereof.

2. The data transmission system of claim 1 wherein said transmission system further comprises:
   means for grouping the receiving signal levels into signal level groups of two in response to said clock signal.

3. The data transmission system of claim 1 wherein said clock signal generating means comprises:
   means for delaying the occurrence of the sampled signal by ½ an encoding period;
   means for shaping said cyclically varying signal;
   means for detecting the rising edge of the signal from said shaping means; and
   means for detecting the falling edge of the signal from said shaping means.

4. The data transmission system of claim 3, further comprising:
   means responsive to said rising edge and falling edge detecting means for grouping the received signal levels into signal level groups of two.

5. The data transmission system of claim 4, further comprising:
   means for detecting the occurrence of the unused two signal level group for a particular encoded three-bit word; and
   means responsive to said detecting means for indicating an error.

6. The data transmission system of claim 5, further comprising:
   means responsive to said error indicating means for substituting a three-bit word, most probably the transmitted three-bit word, for the three-bit word represented by the detected unused two signal level group.

7. The data transmission system of claim 4 wherein said grouping means responds to said falling edge detecting means for an indication of the occurrence of the second encoding period in every three-bit word.

8. The data transmission system of claim 1 wherein said transmission system further comprises:
    means for grouping the received signal levels into signal level groups of two in response to said clock signal;
    means for detecting the occurrence of the unused two signal level group; and
    means responsive to said detecting means for indicating an error.

9. The data transmission system of claim 8, further comprising:
    means responsive to said error indicating means for substituting a three-bit word, most probably the transmitted three-bit word, for the three-bit word represented by the detected unused two signal level group.

* * * * *